(12) United States Patent
Subramanian et al.

(10) Patent No.: US 12,131,577 B2
(45) Date of Patent: Oct. 29, 2024

(54) PERSON-OF-INTEREST (POI) DETECTION

(71) Applicant: Sensormatic Electronics, LLC, Boca Raton, FL (US)

(72) Inventors: Gopi Subramanian, Delray Beach, FL (US); Joseph Celi, Boca Raton, FL (US); Michael C. Stewart, Delray Beach, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 50 days.

(21) Appl. No.: 17/557,704

(22) Filed: Dec. 21, 2021

(65) Prior Publication Data

US 2023/0196824 A1 Jun. 22, 2023

(51) Int. Cl.
*G06V 40/10* (2022.01)
*G06F 16/903* (2019.01)
(Continued)

(52) U.S. Cl.
CPC ...... *G06V 40/155* (2022.01); *G06F 16/90335* (2019.01); *G06V 10/74* (2022.01);
(Continued)

(58) Field of Classification Search
None
See application file for complete search history.

(56) References Cited

U.S. PATENT DOCUMENTS

| 2004/0245330 A1* | 12/2004 | Swift | G06Q 20/04 235/379 |
| 2009/0131836 A1* | 5/2009 | Enohara | G08B 13/19613 600/595 |

(Continued)

FOREIGN PATENT DOCUMENTS

WO 2020247596 A1 12/2020

OTHER PUBLICATIONS

International Search Report in PCT/US2022/081948, mailed Mar. 14, 2023, 6 pages.
(Continued)

*Primary Examiner* — James M Anderson, II
(74) *Attorney, Agent, or Firm* — ARENTFOX SCHIFF LLP (57) ABSTRACT

Example implementations include a method, apparatus and computer-readable medium for person detection by a computer device, comprising receiving a plurality of video frames from a camera located in an environment, wherein the video frames include a depiction of a person in the environment. The implementations further include identifying attributes of the person from the video frames and comparing the attributes with attribute entries in a database of suspicious persons, wherein the database of suspicious persons includes attributes of a plurality of persons associated with an alert in the environment. The implementations include retrieving a profile indicative of an alert history of the suspicious person in response to determining a match between the attributes of the person and an entry in the database corresponding to a suspicious person, and transmitting, to a second computer device, the retrieved profile and a notification that indicates that the suspicious person is in the environment.

21 Claims, 6 Drawing Sheets

(51) Int. Cl.
 *G06V 10/74* (2022.01)
 *G06V 20/52* (2022.01)
 *G06V 40/16* (2022.01)
 *G06V 40/20* (2022.01)
 *G06V 40/50* (2022.01)
 *G08B 13/196* (2006.01)
 *G08B 31/00* (2006.01)
 *H04N 7/18* (2006.01)
 *H04N 23/66* (2023.01)
 *H04N 23/69* (2023.01)
 *H04N 23/695* (2023.01)

(52) U.S. Cl.
 CPC ............ *G06V 20/52* (2022.01); *G06V 40/172* (2022.01); *G06V 40/25* (2022.01); *G06V 40/50* (2022.01); *G08B 13/19613* (2013.01); *G08B 31/00* (2013.01); *H04N 7/183* (2013.01); *H04N 23/66* (2023.01); *H04N 23/69* (2023.01); *H04N 23/695* (2023.01)

(56) References Cited

U.S. PATENT DOCUMENTS

| | | | |
|---|---|---|---|
| 2017/0278348 A1* | 9/2017 | Takeda | H04N 23/611 |
| 2018/0239953 A1* | 8/2018 | Miwa | G08B 25/04 |
| 2018/0247504 A1 | 8/2018 | Siminoff et al. | |
| 2020/0057885 A1* | 2/2020 | Rao | G06V 40/172 |
| 2020/0210684 A1 | 7/2020 | Stivers et al. | |
| 2021/0390287 A1* | 12/2021 | Rozner | G06V 40/173 |

OTHER PUBLICATIONS

Written Opinion in PCT/US2022/081948, mailed Mar. 14, 2023, 8 pages.
Hu et al., "A Survey on Visual Surveillance of Object Motion and Behaviors," IEEE Transactions on Systems, Man, and Cybernetics: Part C: Applications and Reviews, Aug. 2004, vol. 34, No. 3, pp. 334-352.

* cited by examiner

PERSON-OF-INTEREST (POI) DETECTION

TECHNICAL FIELD

The described aspects relate to computer vision.

BACKGROUND

In a retail setting, crime such as theft and vandalism are prominent issues. Crime prevention is often delegated to security personnel (e.g., guards, police, etc.) or staff (e.g., cashiers, managers, custodians, etc.). In some cases, physical alarms (e.g., tag detectors) may be placed in the retail environment entry/exit points to help alert security personnel and/or staff of an event such as theft. Unfortunately, reliance on manual crime prevention is ineffective because security personnel and/or staff cannot easily differentiate between customers with no criminal record and customers with a prominent criminal record. Thus, crime prevention is not focused specifically on persons of interest (i.e., persons with a higher likelihood of performing a crime based on their criminal activity).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

To address one or more of the above-noted shortcomings, aspects of the present disclosure relate generally to security systems, and more particularly, to detecting a person-of-interest (POI) in an environment.

An example implementation includes a method for person detection by a computer device, comprising receiving a plurality of video frames from a camera located in an environment, wherein the video frames include a depiction of a person in the environment. The method further includes identifying attributes of the person from the video frames. Additionally, the method further includes comparing the attributes with attribute entries in a database of suspicious persons, wherein the database of suspicious persons includes attributes of a plurality of persons associated with an alert in the environment. Additionally, the method further includes retrieving a profile indicative of an alert history of the suspicious person in response to determining a match between the attributes of the person and an entry in the database corresponding to a suspicious person. Additionally, the method further includes transmitting, to a second computer device, the retrieved profile and a notification that indicates that the suspicious person is in the environment.

Another example implementation includes an apparatus for person detection by a computer device, comprising a memory and a processor in communication with the memory. The processor is configured to receive a plurality of video frames from a camera located in an environment, wherein the video frames include a depiction of a person in the environment. The processor is further configured to identify attributes of the person from the video frames. Additionally, the processor further configured to compare the attributes with attribute entries in a database of suspicious persons, wherein the database of suspicious persons includes attributes of a plurality of persons associated with an alert in the environment. Additionally, the processor further configured to retrieve a profile indicative of an alert history of the suspicious person in response to determining a match between the attributes of the person and an entry in the database corresponding to a suspicious person. Additionally, the processor further configured to transmit, to a second computer device, the retrieved profile and a notification that indicates that the suspicious person is in the environment.

Another example implementation includes a computer-readable medium for person detection by a computer device, executable by a processor to receive a plurality of video frames from a camera located in an environment, wherein the video frames include a depiction of a person in the environment. The instructions are further executable to identify attributes of the person from the video frames. Additionally, the instructions are further executable to compare the attributes with attribute entries in a database of suspicious persons, wherein the database of suspicious persons includes attributes of a plurality of persons associated with an alert in the environment. Additionally, the instructions are further executable to retrieve a profile indicative of an alert history of the suspicious person in response to determining a match between the attributes of the person and an entry in the database corresponding to a suspicious person. Additionally, the instructions are further executable to transmit, to a second computer device, the retrieved profile and a notification that indicates that the suspicious person is in the environment.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

To address the shortcomings of conventional crime prevention approaches, the present disclosure presents a security system that monitors video frames for persons of interest. For example, a person of interest (used interchangeably with suspicious person) in the retail setting may be a person that has a record associated with one or more attempted or actual thefts. The security system may alert a security personnel or staff member about the presence of the person-of-interest (POI) so that he/she may direct their attention to the POI and prevent potential crime. In some cases, a profile detailing the prior attempted or actual criminal activities of the POI may be presented the security personnel or staff in a graphical user interface (GUI).

Figure 1A:
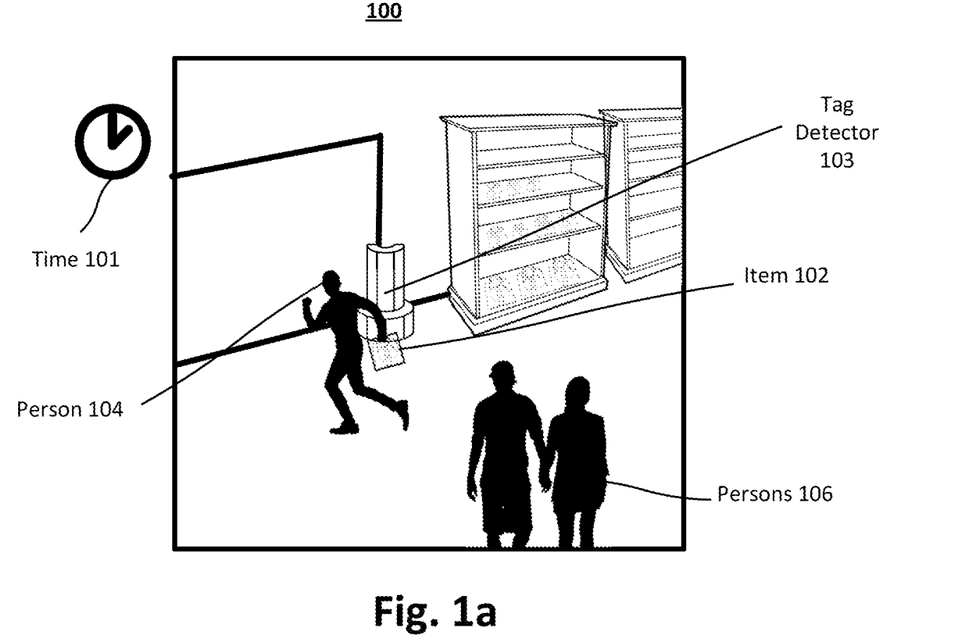
FIG. 1a is a diagram of an image frame capturing a person tagged by an alert, in accordance with exemplary aspects of the present disclosure.

FIG. 1a is a diagram of image frame 100 capturing a person tagged by an alert, in accordance with exemplary aspects of the present disclosure. Frame 100 may be captured at time 101 (e.g., Monday, 2 pm). In frame 100, person 104 is shown to be stealing item 102 from a retail environment. Persons 106 are additional customers that are shopping. Item 102 may be a shirt with a security tag on it. When person 104 runs through the door, tag detector 103 may detect a signal from the tag on item 102 and may generate an alarm (e.g., audio alarm, visual alarm, and/or an electronic alarm notification or message)—alerting security personnel and/or staff in the retail environment.

Figure 1B:
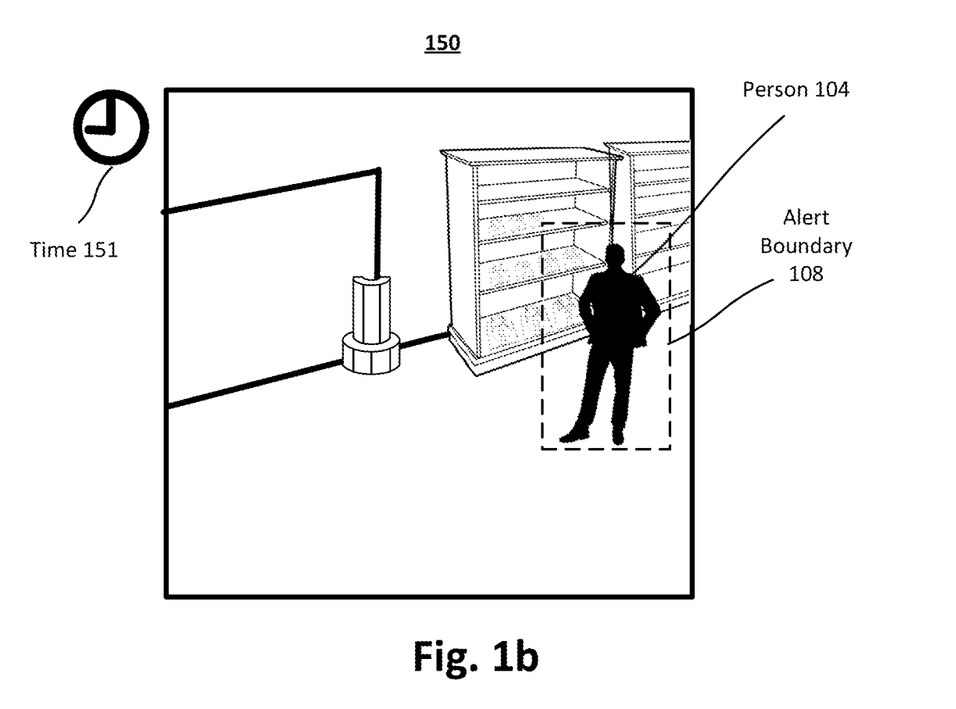
FIG. 1b is a diagram of an image frame with a person-of-interest (POI) bounded by an alert boundary, in accordance with exemplary aspects of the present disclosure.

FIG. 1b is a diagram of image frame 150 with a person-of-interest (POI) bounded by an alert boundary, in accordance with exemplary aspects of the present disclosure. Frame 150 may be captured at time 151 (e.g., Thursday, 9 pm). The security system of the present disclosure may store attributes of person 104 captured at a time window including time 101. The attributes may be compared against all customers entering the retail environment. Suppose that person 104 in image frame 100 returns to the retail environment, such as in image frame 150. In response to a security system (such as security system 200 of FIG. 2) detecting the attributes of person 104 in frame 150 and matching them to the attributes of person 104 in frame 100, e.g., identifying person 104 as a POI, the security system may be triggered to automatically track person 104, which may include generating an alert boundary 108 on all image frames captured in real-time and transmitting the frames to security personnel and/or staff members in the retail environment.

Figure 2:
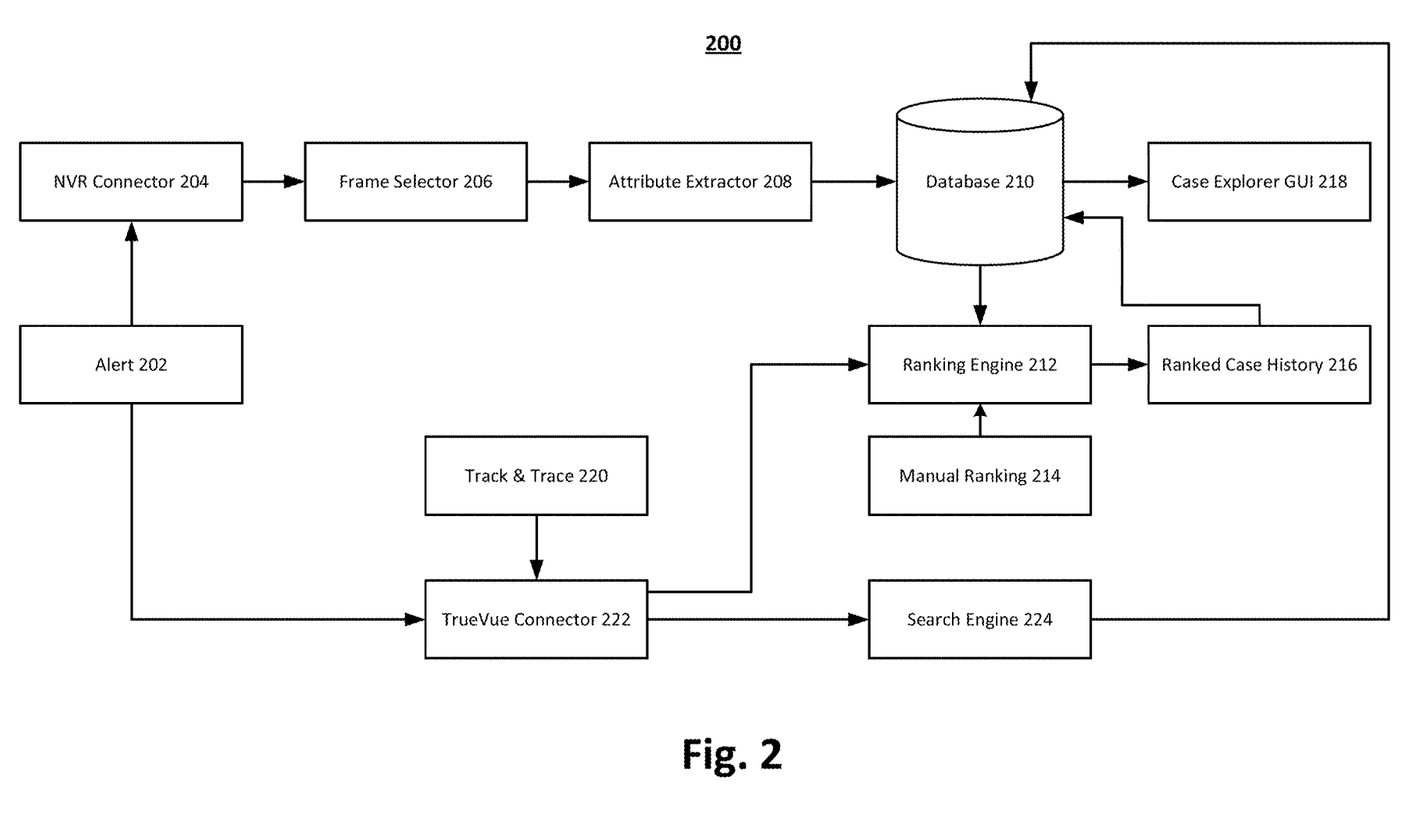
FIG. 2 is a diagram of a system for detecting a POI, in accordance with exemplary aspects of the present disclosure.

FIG. 2 is a diagram of security system 200 for detecting a POI, in accordance with exemplary aspects of the present disclosure. Security system 200 generates database 210 that implements a novel indexing system for quick and accurate retrieval of historical events based on person re-identification. Database 210 can be used for crime forensics, evidence gathering, and insights that can be utilized from both predictive and prescriptive analytics. Database 210 can also be used to build a case against an offender that may be used for prosecution or a reason to profile that person. Some of the features of security system 200 include person identification using a combination of features derived from custom deep learning models in a computer vision pipeline and index-based data storage and retrieval. In some aspects, security system 200 is actively learning using various feedback loops and human interactions to enable POI surveillance, fencing location determination (e.g., where stolen products are resold), new suspect alerts and information, crime schedule prediction, crime network analysis (e.g., when multiple suspects are committing crimes), among other aspects.

Security system 200 may serve as an asset protection advisor in which database 210 stores computer-vision-based subject characteristics, case histories for subjects, rankings of criminal levels of a subject (e.g., active learning of severity associated with suspected individuals), associated fencing locations, and targeted retailers. Security system 200 may perform automatic profiling of suspects using image frames, alarms, and other related data to assist case building.

In FIG. 2, a plurality of components of security system 200 are shown. Alert 202 represents an indication of an event such as vandalism or theft. For example, when item 102 is stolen by person 104, tag detector 103 may generate an alarm (e.g., an audible and/or visual alarm, and/or an electronic notification message). The alarm may also include an alert notification that is transmitted to a device belonging to security personnel (e.g., a smartphone of a security guard), where the alert notification indicates which item was stolen. For example, if item 102 is an electronic product, the alert notification may include an electronic product code (EPC) so that the security personnel member(s) know which item was stolen. In general, the indication of which item was stolen may be any universal identifier and/or alphanumeric code and/or description that identifies the specific item that was stolen.

There are two avenues of security system 200 that stem from alert 202. One avenue leads to network video recorder (NVR) connector 204 to receive image frames including person 104. The other avenue leads to TrueVue connector 222 to track whether the stolen item is being resold.

NVR connector 204 may receive video image frames from all of the cameras in the retail environment. Frame selector 206 narrows down the frames to consider for creating/updating a case about the event. In some aspects, frame selector 206 identifies a time window preceding the timestamp at which alert 202 was generated. For example, if alert 202 was generated at 2 pm, the time window may be a 15-minute window between 1:45 pm and 2 μm. In some aspects, security system 200 may identify person 104 and determine when person 104 first entered the retail environment. Suppose that the first frame in which person 104 was detected in a given day is 1:40 pm. In this case, the time window may be 20 minutes (e.g., 1:40 μm to 2:00 pm). In some aspects, frames may be manually selected by security personnel. For example, security personnel may manually identify the person that performed the theft and may select all frames that feature the person.

Attribute extractor 208 may identify different attributes of person 104 in the selected frames. For example, attribute extractor 208 may estimate a gender, height, age, weight, etc., of person 104 using computer vision and machine learning (e.g., machine learning may be used to approximate the age of person 104). Security system 200 places the extracted attributes in database 210. Accordingly, if person 104 reappears at time 151 (FIG. 1b) and security system 200 extracts attributes of person 104, by comparing the attributes stored in database 210 and finding a match, security system 200 may be able to alert security personnel to focus their attention of person 104.

Database 210 may include information about each person that is associated with criminal activity and may also store information about each incident of criminal activity. For example, database 210 may include, for a particular incident, a store ID, timestamps, camera ID, NVR ID, region ID, enterprise ID, frame IDs, person ID (e.g., name, biometrics, etc.), attributes extracted, frames, ranking parameters, item ID, item details (e.g., monetary value, weight, size, product type, etc.). A user accessing database 210 may be able to sort the database based on incidents or by persons involved. More specifically, a user may access database 210 via case explorer GUI 218.

TrueVue connector 222 may monitor inventory in the retail environment. When an item is stolen (e.g., item 102), the inventory is updated and the item is tracked. Using track & trace 220, which is a component that stores information about where the universal identifier of the item reappears on the Internet after the theft, security personnel can determine fencing locations where stolen goods are resold. By shutting down fencing locations, security personnel deter future crime. Search engine 224 is used to search for entries in database 210 that are associated with a particular person/case involved with the theft of an item to add more information (e.g., where the item is being resold).

Ranking engine 212 may receive item details such as pricing and product type, which may be used to determine a ranking for an individual. The ranking approach allows security personnel to identify the most prominent criminals. For example, a ranking may be determined based on the total value of items stolen (e.g., $3000), the frequency of thefts, the types of products stolen (e.g., electronics, clothing, jewelry, etc.), etc. In some aspects, security personnel may provide manual ranking 214 to ranking engine 212. The ranked case history 216 including a current rank of a person along with previous rankings is stored in database 210 for future presentation via GUI 218. In some aspects, a ranking may be presented to a user for confirmation of the ranking.

In some aspects, the profiles of the top N ranked individuals may be presented to security personnel by security system 200, where N is an integer that may be configured by an operator of the system. The security personnel may present the information to law enforcement or continue further monitoring. It should be noted that the contents of database 210 may be shared by different environments. For example, person 104 may steal item 102 from a first store and then attempt to steal a different item from a different store. Both stores may share information via a single database 210 stored on the cloud. Accordingly, security system 200 in the different store may recognize person 104 and alert security personnel. Conventional security systems do not communicate with other security systems in different environments. Accordingly, they are unable to determine whether a person that has stolen from another store should be monitored with extra scrutiny.

Figure 3:
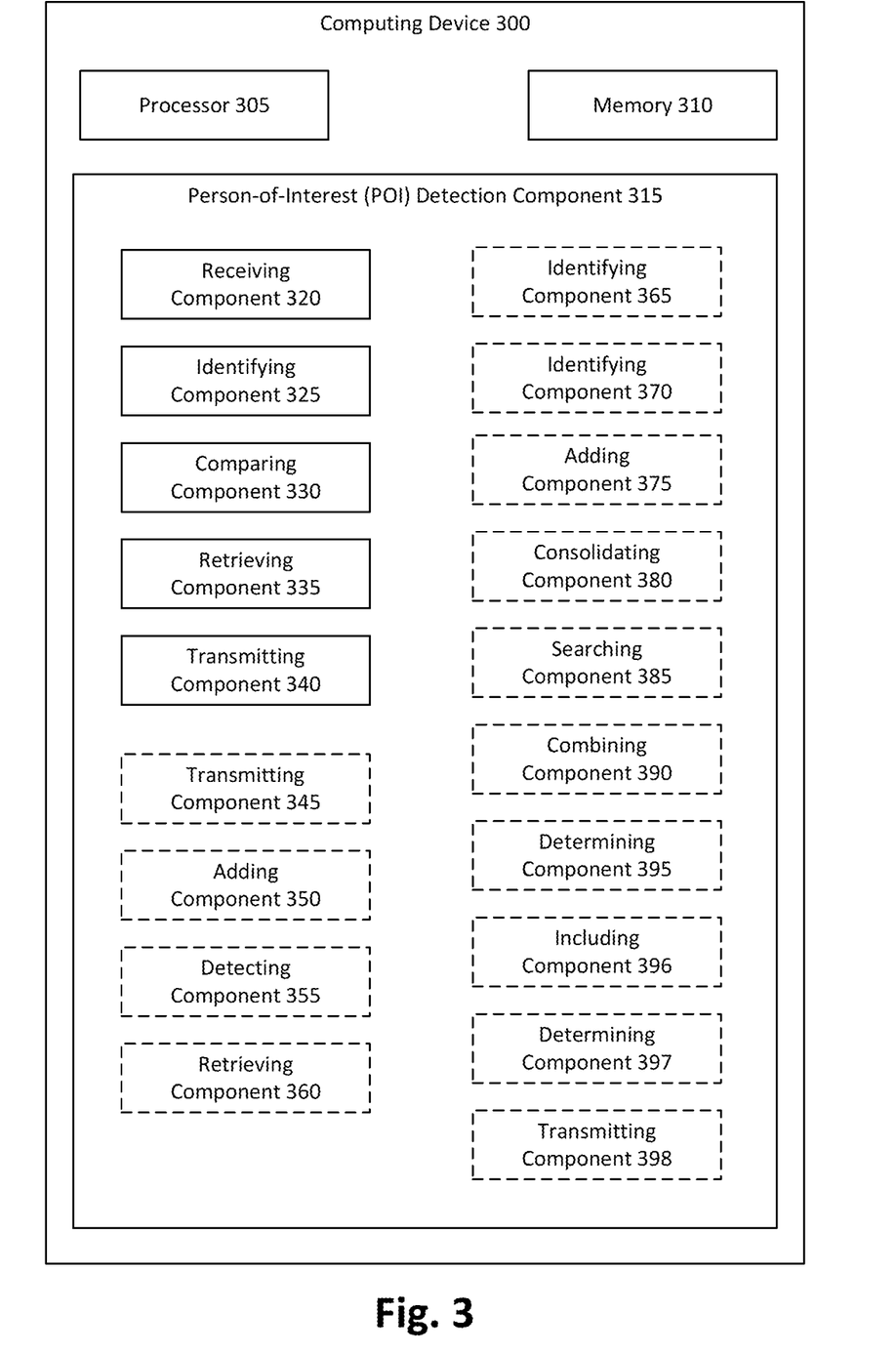
FIG. 3 is a block diagram of a computing device executing a POI detection component, in accordance with exemplary aspects of the present disclosure.
Figure 4:
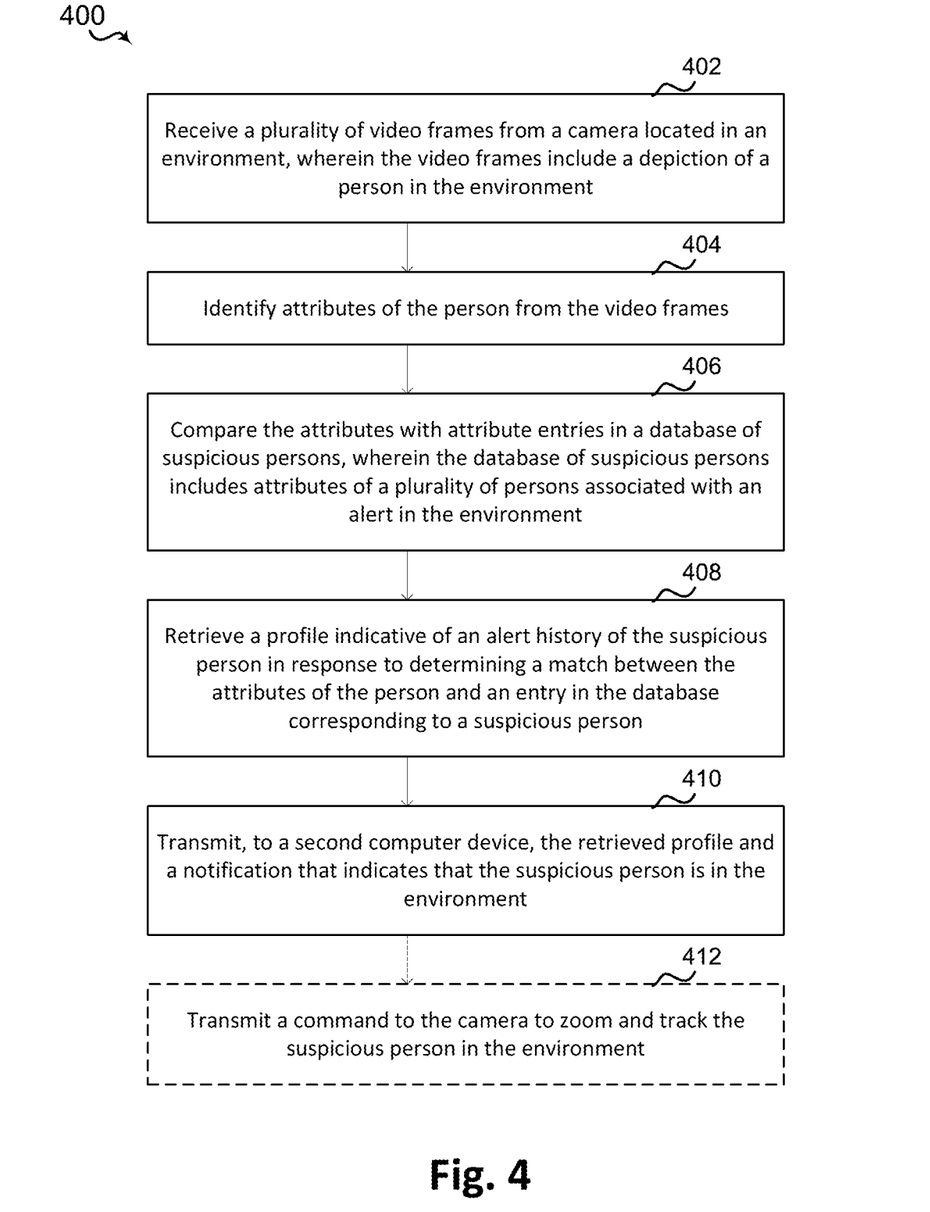
FIG. 4 is a flowchart of a method of detecting a POI, in accordance with exemplary aspects of the present disclosure.

FIG. 3 is a block diagram of computing device 300 executing POI detection component 315 to perform POI detection and other functionality described herein, in accordance with exemplary aspects of the present disclosure. POI detection component 315 may comprise the security system 200 components described in FIG. 2. FIG. 4 is a flowchart illustrating method 400 of detecting a POI, in accordance with exemplary aspects of the present disclosure. Referring to FIG. 3 and FIG. 4, in operation, computing device 300 may perform a method 400 by execution of POI detection component 315 by processor 305 and/or memory 310.

At block 402, the method 400 includes receiving a plurality of video frames from a camera located in an environment, wherein the video frames include a depiction of a person in the environment. For example, in an aspect, computing device 300, processor 305, memory 310, POI detection component 315, and/or receiving component 320 may be configured to or may comprise means for receiving a plurality of video frames (e.g., include image from 150) from a camera located in an environment (e.g., a store), wherein the video frames include a depiction of a person (e.g., person 104) in the environment. The term video frame is used interchangeably with image frame.

At block 404, the method 400 includes identifying attributes of the person from the video frames. For example, in an aspect, computing device 300, processor 305, memory 310, POI detection component 315, and/or identifying component 325 may be configured to or may comprise means for identifying attributes of the person from the video frames. For example, identifying component 325 may employ machine learning (e.g., Bayes classification) to detect person 104 in each of the plurality of video frames and generate a boundary around the person (e.g., boundary 108). The boundary isolates the person from the surroundings for easier tracking. Additionally, the pixels within the boundary can be isolated for attribute identification. For example, the image within the boundary may be input into a neural network that is configured to estimate biometrics of the person such as gender, weight, age, height, etc. Using all of the images bounding person 104 across all received frames, a gait of person 104 may also be extracted. For example, a video showing the person walking may be an attribute representative of gait. These features are specifically identified because criminals may change visuals such as clothes or may come at different times of the day/week to throw off security systems. However, biometrics and gait are generally unique to a person and are not easily/commonly changed.

At block 406, the method 400 includes comparing the attributes with attribute entries in a database of suspicious persons, wherein the database of suspicious persons includes attributes of a plurality of persons associated with an alert in the environment. For example, in an aspect, computing device 300, processor 305, memory 310, POI detection component 315, and/or comparing component 330 may be configured to or may comprise means for comparing the attributes with attribute entries in a database of suspicious persons (e.g., database 210), wherein the database of suspicious persons includes attributes of a plurality of persons associated with an alert in the environment.

In some aspects, comparing the attributes with attribute entries in a database of suspicious persons comprises executing a machine learning algorithm configured to match an input attribute vector of any person to a known suspicious person. Each element in the input vector may represent a specific attribute (e.g., gender) and comparing component 330 may identify a match if at least a certain percentage of the attributes match. Some attributes such as gender may be non-negotiable. Thus, if the gender of a known suspicious person is female and the gender of person 104 is male, comparing component 330 may determine that person 104 is not the known suspicious person. For attributes such as gait, comparing component 330 may compare the movements in the plurality of video frames of person 104 with a plurality of video frames of the known suspicious person.

At block 408, the method 400 includes retrieving a profile indicative of an alert history of the suspicious person in response to determining a match between the attributes of the person and an entry in the database corresponding to a suspicious person. For example, in an aspect, computing device 300, processor 305, memory 310, POI detection component 315, and/or retrieving component 335 may be configured to or may comprise means for retrieving a profile indicative of an alert history of the suspicious person in response to determining a match between the attributes of the person and an entry in the database corresponding to a suspicious person.

For example, if the matching threshold is 80% and there is a match/correspondence between at least 80% of attributes, retrieving component 335 may determine that person 104 is the known suspicious person. As will be described in FIG. 5 (in the context of FIGS. 1a, 1b), POI detection component 315 may generate an entry for person 104 in the database of suspicious persons in response to detecting the theft performed at time 101. When person 104 returns to the same store or a different store at time 151, there should already be an entry for person 104 as a known suspicious person. Thus, there should be a match detected when person 104 is detected at time 151.

At block 410, the method 400 includes transmitting, to a second computer device, the retrieved profile and a notification that indicates that the suspicious person is in the environment. For example, in an aspect, computing device 300, processor 305, memory 310, POI detection component 315, and/or transmitting component 340 may be configured to or may comprise means for transmitting, to a second computer device, the retrieved profile and a notification that indicates that the suspicious person is in the environment.

For example, the second computer device may belong to security personnel or a staff member at the environment. Transmitting component 340 may transmit the retrieved profile and the notification to allow security personnel to either apprehend person 104 or further monitor their behavior. In some aspects, the notification is transmitted as a part of GUI 218. Via GUI 218, a live feed of person 104 may be presented to security personnel on the second computer device. In some aspects, alert boundary 108 may be generated around person 104 for easier identification. The retrieved profile may include the various attributes approximated for person 104, their previous criminal activity, a criminal rank, etc.

In an optional aspect, at block 412, the method 400 may further includes transmitting a command to the camera to zoom and track the suspicious person in the environment. For example, in an aspect, computing device 300, processor 305, memory 310, POI detection component 315, and/or transmitting component 345 may be configured to or may comprise means for transmitting a command to the camera to zoom and track the suspicious person in the environment.

For example, transmitting component 345 may transmit the command to enable tracking of person 104 as he/she navigates the environment. By tracking and zooming into person 104, the quality of evidence against person 104 is enhanced. In some aspects, the retrieved profile may also list other individuals that work with person 104 to commit crimes. Transmitting component 345 may further transmit a command to detect those individuals and track their movements in the environment as well.

Figure 5:
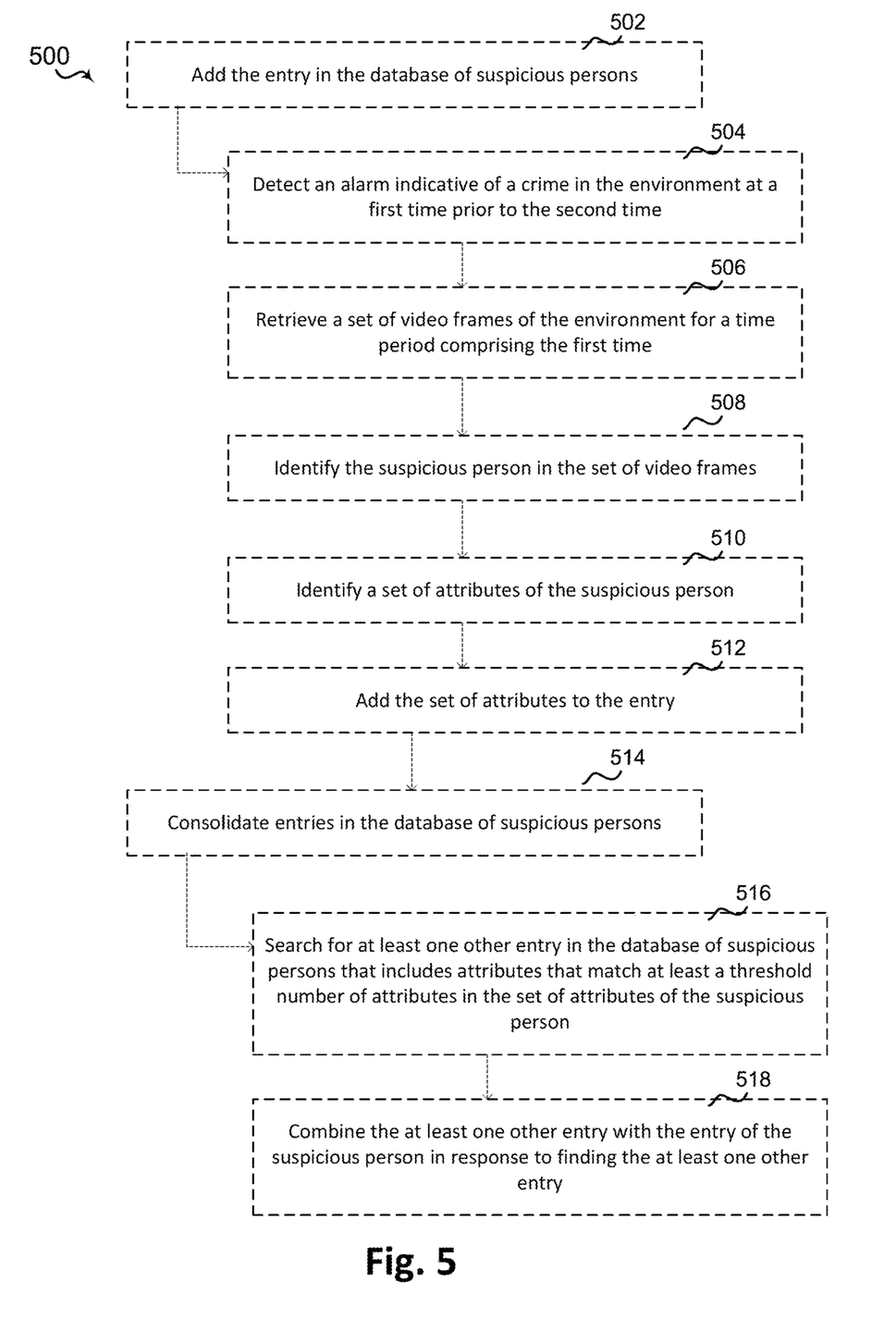
FIG. 5 is a flowchart of further aspects of the method of FIG. 4, including maintaining a database of suspicious persons, in accordance with exemplary aspects of the present disclosure.

FIG. 5 is a flowchart illustrating additional aspects of the method 400 of FIG. 4, including a method 500 of maintaining a database of suspicious persons, in accordance with exemplary aspects of the present disclosure. In order for POI detection component 315 to effectively identify POIs at block 406 and 408 of method 400, the database of suspicious persons needs to be updated and maintained. The method 500 comprises two primary blocks 502 and 514. Executing block 502 involves executing blocks 504-512, and executing block 514 involves executing blocks 516-518.

In an optional aspect, referring to FIG. 5, at block 502, wherein the video frames are received at a second time, the method 500 may further include adding the entry in the database of suspicious persons. For example, in an aspect, computing device 300, processor 305, memory 310, POI detection component 315, and/or adding component 350 may be configured to or may comprise means for adding the entry in the database of suspicious persons. To get to the adding step, method 500 goes through blocks 504-512.

In this optional aspect, at block 504, the method 500 may further include detecting an alarm indicative of a crime in the environment at a first time prior to the second time. For example, in an aspect, computing device 300, processor 305, memory 310, POI detection component 315, and/or detecting component 355 may be configured to or may comprise means for detecting an alarm generated by tag detector 103 indicative of a crime in the environment at a first time (e.g., time 101) prior to the second time (e.g., time 151). As discussed, the alarm may be for a theft committed by the suspicious person triggered by a tag that includes detail information about an item that is stolen, the detail information including at least one of an identifier of the item, a price of the item, or manufacturing information (e.g., company, batch number, country of origin, etc.).

In this optional aspect, at block 506, the method 500 may further include retrieving a set of video frames of the environment for a time period comprising the first time. For example, in an aspect, computing device 300, processor 305, memory 310, POI detection component 315, and/or retrieving component 360 may be configured to or may comprise means for retrieving a set of video frames of the environment for a time period comprising the first time.

For example, retrieving component 360 may retrieve all frames including person 104 within a threshold time period from image frame 100. Suppose that the threshold time period is 15 minutes and frame 100 was captured at 2:00 pm. Retrieving component 360 may retrieve all frames between 1:50 μm and 2:05 pm (e.g., 10 minutes before the alarm to see what person 104 was doing and 5 minutes after to see where person 104 went).

In this optional aspect, at block 508, the method 500 may further includes identifying the suspicious person in the set of video frames. For example, in an aspect, computing device 300, processor 305, memory 310, POI detection component 315, and/or identifying component 365 may be configured to or may comprise means for identifying the suspicious person in the set of video frames.

For example, a security personnel may manually tag person 104 on at least one video frame and identifying component 365 may identify the tagged person 104 on all other video frames using computer vision. In some aspects, identifying component 365 may automatically identify person 104 in the frame if person 104 is the only person identifiable in the video frames. In some aspects, identifying component 365 may identify, using computer vision, the item being stolen/vandalized (as indicated by the alarm) and identify person 104 in response to determining that person 104 is holding the item or is in close proximity to the item.

In this optional aspect, at block 510, the method 500 may further include identifying a set of attributes of the suspicious person. For example, in an aspect, computing device 300, processor 305, memory 310, POI detection component 315, and/or identifying component 370 may be configured to or may comprise means for identifying a set of attributes of the suspicious person.

As discussed previously, the attributes include representations of one or more of: a facial image, an attire, a gender, an approximate age, a gait, a dwell time, and movements uncommon with an activity performed in the environment (e.g., if the activity is shopping, loitering would be considered uncommon or making side glances would be considered uncommon).

In this optional aspect, at block 512, the method 500 may further include adding the set of attributes to the entry. For example, in an aspect, computing device 300, processor 305, memory 310, POI detection component 315, and/or adding component 375 may be configured to or may comprise means for adding the set of attributes to the entry. For example, adding component 375 may generate an entry in the database of suspicious persons that includes an image of person 104 and details about the attributes extracted. As discussed previously, other details may include those about the item vandalized or stolen.

In this optional aspect, at block 514, the method 500 may further include consolidating entries in the database of suspicious persons. For example, in an aspect, computing device 300, processor 305, memory 310, POI detection component 315, and/or consolidating component 380 may be configured to or may comprise means for consolidating entries in the database of suspicious persons. To prevent duplicate entries for the same person, consolidating component 380 may identify incidents that are associated with the same person and combine them into one profile. For example, if person 104 went to a different store in the past and committed a crime, a local profile may have been generated by POI detection component 315. Periodically, POI detection component 315 may synchronize all entries across different security systems.

In this optional aspect, at block 516, the method 500 may further include searching for at least one other entry in the database of suspicious persons that includes attributes that match at least a threshold number of attributes in the set of attributes of the suspicious person. For example, in an aspect, computing device 300, processor 305, memory 310, POI detection component 315, and/or searching component 385 may be configured to or may comprise means for searching for at least one other entry in the database of suspicious persons that includes attributes that match at least a threshold number of attributes in the set of attributes of the suspicious person.

For example, searching component 385 may search for at least two entries in which at least 80% of attributes match. These attributes may include gender, estimated height, weight, clothing, facial features, biometrics such as fingerprints, etc.

In this optional aspect, at block 518, the method 500 may further include combining the at least one other entry with the entry of the suspicious person in response to finding the at least one other entry. For example, in an aspect, computing device 300, processor 305, memory 310, POI detection component 315, and/or combining component 390 may be configured to or may comprise means for combining the at least one other entry with the entry of the suspicious person in response to finding the at least one other entry.

For example, in response to determining that there is a significant match between different profiles, combining component 390 may combine the entries into one entry with all of the attributes. This improves the search process because there are fewer entries that need to be sifted and/or indexed.

Figure 6:
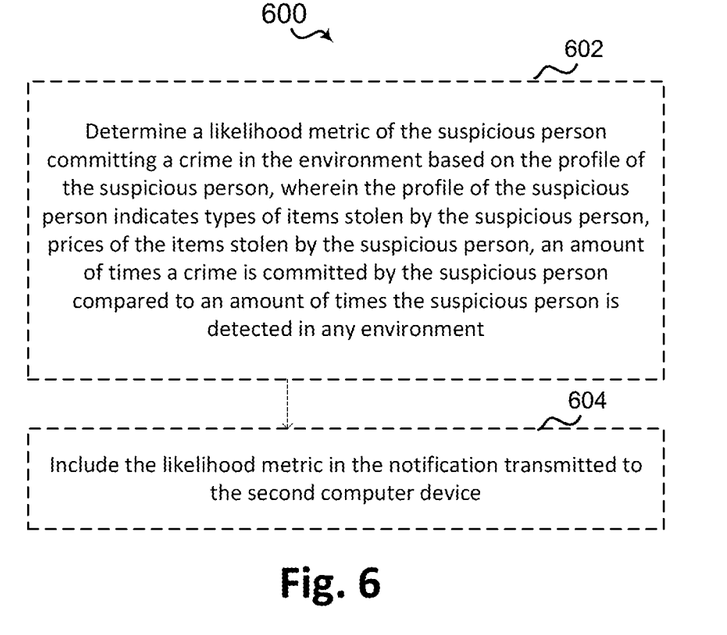
FIG. 6 is a flowchart of further aspects of the method of FIG. 4, including determining a likelihood of a suspicious person committing a crime, in accordance with exemplary aspects of the present disclosure.

FIG. 6 is a flowchart illustrating additional aspects of the method 400 of FIG. 4, including a method 600 of determining a likelihood of a suspicious person committing a crime, in accordance with exemplary aspects of the present disclosure.

In an optional aspect, referring to FIG. 6, at block 602, the method 600 may further include determining a likelihood metric of the suspicious person committing a crime in the environment based on the profile of the suspicious person, wherein the profile of the suspicious person indicates types of items stolen by the suspicious person, prices of the items stolen by the suspicious person, an amount of times a crime is committed by the suspicious person compared to an amount of times the suspicious person is detected in any environment. For example, in an aspect, computing device 300, processor 305, memory 310, POI detection component 315, and/or determining component 395 may be configured to or may comprise means for determining a likelihood metric of the suspicious person committing a crime in the environment based on the profile of the suspicious person, wherein the profile of the suspicious person indicates types of items stolen by the suspicious person, prices of the items stolen by the suspicious person, an amount of times a crime is committed by the suspicious person compared to an amount of times the suspicious person is detected in any environment.

For example, determining component 395 may be a machine learning algorithm that is trained to output a probability of an alert being generated as a result of the suspicious person entering the environment. The machine learning algorithm may be trained on a dataset that includes a plurality of training vectors. Any given training vector may have a historic portion, a current portion, and a verdict. The historic portion may include parameters such as types of items stolen by the suspicious person, prices of the items stolen by the suspicious person, an amount of times a crime is committed by the suspicious person compared to an amount of times the suspicious person is detected in any environment. The current portion may list details about the person in the current situation. For example, the details may include the type of store the person is in, the product types in the vicinity of the person, the amount of security personnel in the store at the time, etc. The verdict is a binary value indicating whether the person performed a crime or not. Given this training dataset, determining component 395 may generate a verdict on whether the person will perform a crime and a confidence score representing how confident the machine learning algorithm is in the verdict.

In this optional aspect, at block 604, the method 600 may further include including the likelihood metric in the notification transmitted to the second computer device. For example, in an aspect, computing device 300, processor 305, memory 310, POI detection component 315, and/or including component 396 may be configured to or may comprise means for including the likelihood metric in the notification transmitted to the second computer device. For example, including component 396 may insert a statement in the notification saying "75% chance that a crime will be committed by the person." Here, the 75% is a confidence score and crime will be committed is the verdict.

Figure 7:
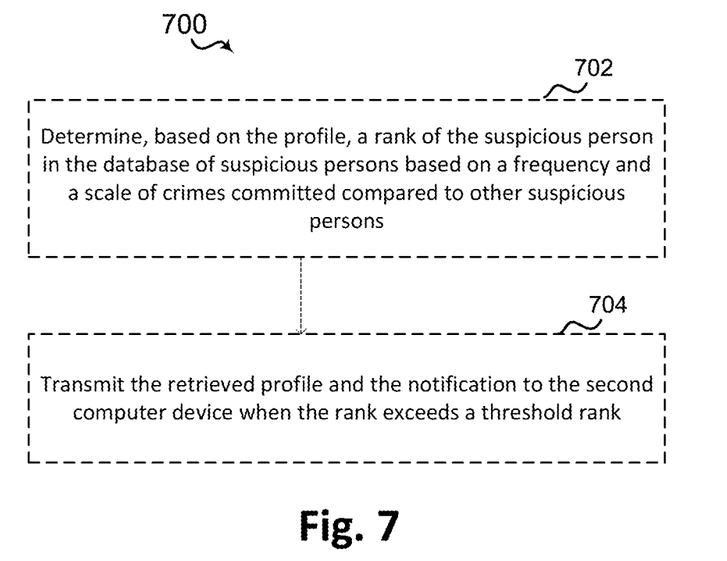
FIG. 7 is a flowchart of further aspects of the method of FIG. 4, including ranking suspicious persons, in accordance with exemplary aspects of the present disclosure.

FIG. 7 is a flowchart illustrating additional aspects of the method 400 of FIG. 4, including a method 700 of ranking suspicious persons, in accordance with exemplary aspects of the present disclosure.

In this optional aspect, at block 702, the method 700 may further include determining, based on the profile, a rank of the suspicious person in the database of suspicious persons based on a frequency and a scale of crimes committed compared to other suspicious persons. For example, in an aspect, computing device 300, processor 305, memory 310, POI detection component 315, and/or determining component 397 may be configured to or may comprise means for determining, based on the profile, a rank of the suspicious person 104 in the database of suspicious persons based on a frequency and a scale of crimes committed compared to other suspicious persons.

For example, determining component 397 may identify the following persons in the database of suspicious persons: person 1, person 2, person 3. In a given period of time (e.g., 1 year), person 1 may have had 5 criminal incidents, person 2 may have had 3 criminal incidents, and person 3 may have had 2 criminal incidents. Determining component 397 may further determine the scale of the crimes for each person based on how many people conspired with the person, an average amount of monetary loss per incident (e.g., including property damage to the environment and theft amount), a median amount of monetary loss per incident, a total monetary loss across all incidents, a dwell time in each incident, and/or how close each incident is (e.g., across stores, across product types, etc.) to each other. Determining component 397 may specifically determine, for each person, a danger rating as a function of any combination of the scale features and frequency. The danger rating function may be a mathematical formula that applies weights to the monetary values and time lengths and outputs a single quantitative value (i.e., the danger rating). The rank is thus a number assigned based on the order of the danger rating. For example, if the danger ratings are 90, 70, and 80, for persons 1, 2, 3, respectively, the respective ranks are "1," "3," "2."

In this optional aspect, at block 704, the method 700 may further include transmitting the retrieved profile and the notification to the second computer device when the rank exceeds a threshold rank. For example, in an aspect, computing device 300, processor 305, memory 310, POI detection component 315, and/or transmitting component 398 may be configured to or may comprise means for transmitting the retrieved profile and the notification to the second computer device when the rank exceeds a threshold rank.

In any situation, there may be hundreds or thousands of person entries in the database of suspicious persons. Some suspicious persons may have participated in minor or one-time incidents. Other suspicious persons may be frequent participators. The latter will likely have higher rankings. To prevent overwhelming a user of the security system, transmitting component 398 filters out lower-ranked persons by comparing a rank of a person to a threshold rank (e.g., 50). If the person has a higher rank, transmitting component 398 may transmit the profile of the person to the second computer device. If the person does not have a higher rank than the threshold, transmitting component 398 may not send the profile of the person. Nonetheless, POI detection component 315 may continue to monitor the behavior of the person in response to determining that the person is identified in the database of suspicious persons. As mentioned previously, for example, a security camera may be configured to zoom into the person and follow the path of the person.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for person detection by a computer device, comprising:
   receiving a plurality of video frames from a camera located in an environment, wherein the video frames include a depiction of a person in the environment;
   identifying attributes of the person from the video frames;
   comparing the attributes with attribute entries in a database of suspicious persons, wherein the database of suspicious persons includes attributes of a plurality of persons associated with an alert in the environment;
   retrieving a profile indicative of an alert history of the suspicious person in response to determining a match between the attributes of the person and an entry in the database corresponding to a suspicious person;
   determining a scale of crimes committed by the suspicious person based on an amount of time between incidents of a certain type, wherein the certain type is one of theft at a particular store or theft of a particular product type;
   determining, based on the profile, a rank of the suspicious person in the database of suspicious persons based on a frequency and the scale of crimes committed by the suspicious person compared to other suspicious persons; and
   transmitting, to a second computer device, the retrieved profile and a notification that indicates that the suspicious person is in the environment when the rank exceeds a threshold rank.

2. The method of claim 1, wherein the attributes include representations of one or more of: a facial image, an attire, a gender, an approximate age, a gait, a dwell time, and movements uncommon with an activity performed in the environment.

3. The method of claim 2, wherein the environment is a store and the activity is shopping.

4. The method of claim 1, further comprising:
   transmitting a command to the camera to zoom and track the suspicious person in the environment.

5. The method of claim 1, wherein the video frames are received at a second time, further comprising adding the entry in the database of suspicious persons by:
   detecting an alarm indicative of a crime in the environment at a first time prior to the second time, wherein the alarm is the alert;
   retrieving a set of video frames of the environment for a time period comprising the first time;
   identifying the suspicious person in the set of video frames;
   identifying a set of attributes of the suspicious person; and
   adding the set of attributes to the entry.

6. The method of claim 5, further comprising consolidating entries in the database of suspicious persons by:
   searching for at least one other entry in the database of suspicious persons that includes attributes that match at least a threshold number of attributes in the set of attributes of the suspicious person; and
   combining the at least one other entry with the entry of the suspicious person in response to finding the at least one other entry.

7. The method of claim 5, wherein the alarm is for a theft committed by the suspicious person triggered by a tag that includes detail information about an item that is stolen, the detail information including at least one of an identifier of the item, a price of the item, or manufacturing information.

8. The method of claim 1, further comprising:
determining a likelihood metric of the suspicious person committing a crime in the environment based on the profile of the suspicious person, wherein the profile of the suspicious person indicates types of items stolen by the suspicious person, prices of the items stolen by the suspicious person, an amount of times a crime is committed by the suspicious person compared to an amount of times the suspicious person is detected in any environment; and
including the likelihood metric in the notification transmitted to the second computer device.

9. The method of claim 1, wherein comparing the attributes with attribute entries in a database of suspicious persons comprises executing a machine learning algorithm configured to match an input attribute vector of any person to a known suspicious person.

10. An apparatus for person detection by a computer device, comprising:
a memory; and
a processor in communication with the memory and configured to:
receive a plurality of video frames from a camera located in an environment, wherein the video frames include a depiction of a person in the environment;
identify attributes of the person from the video frames;
compare the attributes with attribute entries in a database of suspicious persons, wherein the database of suspicious persons includes attributes of a plurality of persons associated with an alert in the environment;
retrieve a profile indicative of an alert history of the suspicious person in response to determine a match between the attributes of the person and an entry in the database corresponding to a suspicious person;
determine a scale of crimes committed by the suspicious person based on an amount of time between incidents of a certain type, wherein the certain type is one of theft at a particular store or theft of a particular product type;
determine, based on the profile, a rank of the suspicious person in the database of suspicious persons based on a frequency and the scale of crimes committed by the suspicious person compared to other suspicious persons; and
transmit, to a second computer device, the retrieved profile and a notification that indicates that the suspicious person is in the environment when the rank exceeds a threshold rank.

11. The apparatus of claim 10, wherein the attributes include representations of one or more of: a facial image, an attire, a gender, an approximate age, a gait, a dwell time, and movements uncommon with an activity performed in the environment.

12. The apparatus of claim 11, wherein the environment is a store and the activity is shopping.

13. The apparatus of claim 10, wherein the processor is further configured to:
transmit a command to the camera to zoom and track the suspicious person in the environment.

14. The apparatus of claim 10, wherein the video frames are received at a second time, wherein the processor is further configured to add the entry in the database of suspicious persons by:
detect an alarm indicative of a crime in the environment at a first time prior to the second time, wherein the alarm is the alert;
retrieve a set of video frames of the environment for a time period comprising the first time;
identify the suspicious person in the set of video frames;
identify a set of attributes of the suspicious person; and
add the set of attributes to the entry.

15. The apparatus of claim 14, wherein the processor is further configured to consolidate entries in the database of suspicious persons by:
search for at least one other entry in the database of suspicious persons that includes attributes that match at least a threshold number of attributes in the set of attributes of the suspicious person; and
combine the at least one other entry with the entry of the suspicious person in response to find the at least one other entry.

16. The apparatus of claim 14, wherein the alarm is for a theft committed by the suspicious person triggered by a tag that includes detail information about an item that is stolen, the detail information including at least one of an identifier of the item, a price of the item, or manufacturing information.

17. The apparatus of claim 10, wherein the processor is further configured to:
determine a likelihood metric of the suspicious person committing a crime in the environment based on the profile of the suspicious person, wherein the profile of the suspicious person indicates types of items stolen by the suspicious person, prices of the items stolen by the suspicious person, an amount of times a crime is committed by the suspicious person compared to an amount of times the suspicious person is detected in any environment; and
include the likelihood metric in the notification transmitted to the second computer device.

18. The apparatus of claim 10, wherein to compare the attributes with attribute entries in a database of suspicious persons comprises executing a machine learning algorithm configured to match an input attribute vector of any person to a known suspicious person.

19. A non-transitory computer-readable medium for person detection by a computer device, executable by a processor to:
receive a plurality of video frames from a camera located in an environment, wherein the video frames include a depiction of a person in the environment;
identify attributes of the person from the video frames;
compare the attributes with attribute entries in a database of suspicious persons, wherein the database of suspicious persons includes attributes of a plurality of persons associated with an alert in the environment;
retrieve a profile indicative of an alert history of the suspicious person in response to determine a match between the attributes of the person and an entry in the database corresponding to a suspicious person;
determine a scale of crimes committed by the suspicious person based on an amount of time between incidents of a certain type, wherein the certain type is one of theft at a particular store or theft of a particular product type;
determine, based on the profile, a rank of the suspicious person in the database of suspicious persons based on a frequency and the scale of crimes committed by the suspicious person compared to other suspicious persons; and transmit, to a second computer device, the retrieved profile and a notification that indicates that the suspicious person is in the environment when the rank exceeds a threshold rank.

20. The method of claim 1, further comprising determining the scale of the crimes based on one or more of: an amount of conspirators with the person, an average amount of monetary loss per criminal incident, a median amount of monetary loss per criminal incident, a total amount of monetary loss across all criminal incidents.

21. The apparatus of claim 10, wherein the processor is further configured to determine the scale of the crimes based on one or more of: an amount of conspirators with the person, an average amount of monetary loss per criminal incident, a median amount of monetary loss per criminal incident, a total amount of monetary loss across all criminal incidents.

* * * * *